3,068,199
CATALYTIC PROCESS FOR PRODUCING
ORGANOPOLYSILOXANE RESINS
Ralph F. Sellers, Middlebush, N.J., assignor to Union
Carbide Corporation, a corporation of New York
No Drawing. Filed Feb. 2, 1959, Ser. No. 790,391
14 Claims. (Cl. 260—46.5)

This invention relates to improved organopolysiloxane resins and to a method for the production thereof. More specifically, this invention relates to organopolysiloxane resins which have particular utility as laminating varnishes for bonding together multi-layers of material such as mineral fiber cloth to form laminated structures which have excellent color stability.

Organopolysiloxane resins are generally desirable for use as the bonding means for uniting multi-layers of material such as mineral fiber cloth into a unitary structure as they contribute to the laminate such properties as hardness, water-proofness, excellent flexural and dielectric strength, excellent arc resistance qualities, and thermal stability. Moreover, the resultant laminates, characterized by excellent mechanical and electrical properties, retain these properties virtually undiminished at relatively high temperatures.

The wide acceptance of organopolysiloxane resins in laminating applications has been seriously limited, however, due to the poor color stability of organopolysiloxane resins produced by hitherto known methods. Laminates made up of multi-layers of material bonded together by such resins darken severely when exposed to relatively high temperatures, especially in the presence of air. Such laminates have been found to discolor even under conditions normally encountered during their manufacture.

The processing cycle for the manufacture of laminated structures is generally conducted in two stages. In the first stage, layers of material such as glass cloth are impregnated with a laminating resin by a dipping, spraying, or other such impregnating operation, stacked one on each other in a laminating press and subjected to heat and pressure until the resin has partially cured and a unitary structure is produced which has sufficient strength, so-called green strength, to be handled manually without deforming. The time required for the laminate to develop green strength usually varies from about ½ to 2 hours depending in part on the number of layers which are to be bonded together, the cure speed of the resin and the temperature and pressure to which the material is subjected. Once the laminate develops green strength, the laminating press is cooled down to room temperature about 23° C., and the laminate removed and placed into an oven, wherein sufficiently high temperatures can be attained to completely cure the laminating resin. The laminate is subjected to this post-cure heating operation until the laminating resin has essentially completely cured.

My present invention provides for the production of organopolysiloxane resins which are particularly desirable as laminating resins, as laminates made up of multi-layers of material such as glass cloth bonded together by the organopolysiloxane resins of the present invention possess excellent color stability in addition to possessing better arc resistance and better dielectric strength than laminates wherein the bonding means is an organopolysiloxane resin produced by hitherto known methods.

In addition, the bonding strength of the organopolysiloxanes of this invention is not adversely affected, as a rule, by sizing agents which are used to treat or "finish" cloth material prior to laminating layers of the cloth material into a unitary structure.

Moreover, the organopolysiloxane resins of the present invention are highly attractive from an economical standpoint as they cure to an infusible state in a shorter period of time than do organopolysiloxane resins produced by heretofore known methods. Materials utilizing these resins are therefore processed into finished products in a relatively short period of time.

The organopolysiloxane resins of the present invention are produced by condensing an organosilanol in the presence of a catalytic amount of an aminoalkyl silicon compound, wherein the aminoalkyl silicon compound contains a group which can be represented by the formula:

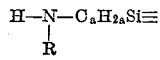

wherein: R is a hydrogen atom, a monovalent hydrocarbon radical such as alkyl, aralkyl, and the like, or a —C$_a$H$_{2a}$Si≡ group that is attached to the nitrogen atom of the aminoalkyl silyl group through a carbon to nitrogen bond; (a) is an integer of from 1 to 15, preferably 3 or 4; and all silicon atoms of the compound are connected to 0 to 3 oxygen atoms which in turn are connected to no atoms other than a carbon atom of a hydrocarbon group, hydrogen or silicon with the remaining unsatisfied valences of the silicon atoms being satisfied by hydrocarbon groups.

Among the most suitable aminoalkyl silicon compounds which can be used as catalysts in the production of organopolysiloxane resins are the aminoalkyl alkoxy silanes. Illustrative of such compounds are the following: gamma-aminopropyltriethoxysilane, gamma-aminopropyltripropoxysilane, gamma - aminopropylethyldiethoxysilane, gamma-aminopropylphenyldiethoxysilane, gamma-aminopropylmethyldiethoxysilane, gamma-aminopropylmethyldimethoxysilane, delta - aminobutylmethyldiethoxysilane, delta - aminobutyltriethoxysilane, delta-aminobutylethyldiethoxysilane, delta-aminobutylphenyldiethoxysilane, bis-(gamma-triethoxysilylpropyl)-amine, and the like.

Illustrative of other aminoalkylsilicon compounds which are suitable for purposes of this invention are: gamma - aminopropyltrimethylsilane, dimethylsiloxane oils containing gamma-aminopropyl groups, dimethylsiloxane oils containing delta-aminobutyl groups, and other like compounds.

The amount of the aminoalkylsilicon compound required to catalyze the condensation reaction involving organosilanols or mixtures thereof to produce the organopolysiloxane resins will vary depending upon the particular silanols which are to be reacted, the reaction conditions under which the condensation reaction is conducted and the particular operating procedures used. Thus, it is difficult to set a definite value for the amount of catalyst required as the amount will vary depending upon the variables previously noted as is well understood in the art.

As a convenient method of producing the organopolysiloxane resins of the present invention, a hydrolyzable silane or mixture of hydrolyzable silanes are hydrolyzed to a silanol or mixture of silanols and the hydrolyzed product condensed in the presence of a catalytic amount of an aminoalkylsilicon to produce a hardenable organopolysiloxane resin.

For example, as one method of producing organopolysiloxane resins of this invention, a mixture of functional or hydrolyzable silanes, i.e. a mixture of chlorosilanes, is slowly added, at a temperature below about 30° C. to an agitated slurry of a compound commonly referred to as an acid accepter suspended in an organic solvent such as ethyl ether, toluene, or acetone containing a sufficient amount of water to initiate and complete hydrolysis of the hydrolyzable silanes. Illustrative of acid accepter compounds are the alkali and alkaline earth metal carbonates and bicarbonates. The slurry is then agitated until the pH of the mixture has a value between 6 and 8. At this point hydrolysis is substantially complete. The slurry is then filtered to remove the insoluble salts and the filter cake is washed with small additions of fresh solvent. The filtrates, containing the silanols, are combined and a catalytic amount of the aminoalkylsilicon compound added thereto whereby the pH of the resultant filtrate is brought to a value between about 7.5 and 8.5. Condensation of the silanols to produce a hardenable organopolysiloxane resin is effected by heating the filtrate for a short period of time.

As an alternative method, a mixture of chlorosilanes is added to a vigorously agitated two-phase solvent system comprising water and an organic solvent immiscible in water, such as toluene, petroleum ether, or isopropyl ether while the temperature of the mixture is maintained below about 50° C. In lieu of the water immiscible organic solvents noted in the preceding sentence, water immiscible organic solvents generally and particularly those which are poor solvents for hydrochloric acid can be used. After completion of the hydrolysis reaction, the aqueous layer which contains by-products produced in the hydrolysis reaction is removed from the organic layer. The organic layer is recovered and washed several times with fresh water until free of the aforementioned by-products. A catalytic amount of the aminoalkylsilicon compound is added to the organic layer and condensation of the silanols therein to produce a hardenable organopolysiloxane resin is effected by heating for a short period of time.

The temperature at which the condensation reaction is conducted is not narrowly critical and will vary depending upon the particular silanols or mixtures thereof which are being condensed. Temperatures below about 0° C. are not preferred as generally the reaction is too sluggish for practical purposes. Temperatures in excess of about 200° C. are also not preferred as at such temperatures undesirable side reactions tend to occur. If desired, the condensation reaction can be conducted in a closed vessel under reduced or superatmospheric pressures.

In each of the two methods described, the organic solvent can be distilled off or the organic solution containing the hardenable organopolysiloxane can be adjusted to the desired solids content and used directly as a laminating varnish.

For purposes of this invention, particularly desirable organopolysiloxane resins are those having a molecular weight of about 3000 as determined by a Menzies-Wright determination.

The organopolysiloxane resins of the present invention harden to an infusible state generally under the influence of heat. It is customary to add a catalyst such as choline or a mixture of choline and benzoyl peroxide to these resins in order to hasten the hardening reaction.

Illustrative of suitable silanes which can be hydrolyzed to form the corresponding silanols are those represented by the formula:

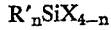

wherein R' is a monovalent hydrocarbon group or substituted hydrocarbon group having as substituents halogen, cyano groups and the like, X is a hydrolyzable group, e.g. halogen or alkoxy, and $n$ has a value of 0 to 3.

The average value of $n$ for a mixture of hydrolyzable silanes is from about 0.95 to about 1.6.

The following compounds are illustrative of hydrolyzable silanes: ethyltrichlorosilane, dimethyldichlorosilane, phenyltrichlorosilane, methylphenyldichlorosilane methyltriethoxysilane, dimethyldiethoxysilane, tetrachlorosilane, methylphenyldiethoxysilane, gamma-chloropropyltrichlorosilane, beta-methyl-gamma-chloropropyltrichlorosilane, chlorophenyltrichlorosilane, beta-cyanoethyltrichlorosilane, dichlorophenyltrichlorosilane, trimethylmonochlorosilane as well as mixtures thereof. The reaction mixture of hydrolyzable silanes can be prepared from purified monomers or monomer mixtures, or from commercially available materials.

The following examples further illustrate the present invention and are not intended to limit the scope thereof in any manner.

Example I

In this example the aminoalkylsilicon catalyst used was gamma-aminopropyltriethoxysilane.

A mixture of hydrolyzable organosilanes was prepared by mixing together 309 grams (2.4 moles) of dimethyldichlorosilane, 304 grams (1.2 moles) of diphenyldichlorosilane, 538 grams (3.6 moles) of methyltrichlorosilane, and 1015 grams (4.8 moles) of phenyltrichlorosilane. One half of this mixture was added with agitation over a period of 2 hours and 25 minutes to a mixture of 4340 grams of isopropyl ether and 2400 grams of water while the temperature of the reaction mixture was kept at between 18° C. and 36° C. At the end of this time the lower aqueous layer was removed by means of a separatory funnel. To the organic layer containing the isopropyl ether there was added 2400 grams of fresh water. To this mixture was then added the remaining half of the chlorosilane mixture. The chlorosilane mixture was added with agitation over a one-hour 25 minutes period while the temperature of the reaction mixture was maintained at between 25° C. and 36° C. The lower aqueous layer was removed by means of a separatory funnel and the organic layer washed twice with 2400 gram portions of water.

Five grams of gamma-aminopropyltriethoxysilane was then added to the organic solution. The reaction mixture was distilled to 115° C. in 1 hour and 50 minutes whereby the volatiles were distilled over leaving a viscous residue. The residue was subjected to a vacuum of 27 inches of mercury for 5 minutes. The residue was then dissolved in 500 grams of toluene and the solution refluxed for 30 minutes with water being separated out in a Dean-Starke trap. The resin solution was cooled to a temperature of about 70° C. and 100 grams of isopropanol then added to form a varnish containing 67.6 percent by weight solids. The solids content of the varnish was determined by subjecting a one gram sample of varnish solution to a temperature of 160° C. for 10 minutes in a 2 inch diameter shallow ointment tin and determining the non-volatile residue remaining.

To a 100 gram sample of the varnish there was added a catalyst comprising 0.035 percent by weight choline and 0.03 percent by weight benzoyl peroxide (percent by weight was based on the solids content of the 100 gram sample). 1.5 grams, placed on a hot plate maintained at 150° C., hardened to an infusible state in 27 seconds. This time is referred to as the gel time.

For purposes of comparison, a varnish designated as Control A was produced according to the procedure described above with the exception that 5 grams of triisopropanol amine was used in lieu of the gamma-aminopropyl triethoxysilane. This varnish became infusible in 93 seconds when tested in the manner described above.

Example II

In this example the aminoalkylsilicon catalyst used was gamma-aminopropyltriethoxysilane.

A mixture of hydrolyzable organosilanes was formed by admixing 309 grams (2.4 moles) of dimethyldichlorosilane, 304 grams (1.2 moles) of disphenyldichlorosilane, 538 grams (3.6 moles) of methyltrichlorosilane, and 1015 grams (4.8 moles) of phenyltrichlorosilane. The mixture of organosilanes was added with agitation below the surface of a slurry comprising 2860 grams (35.2 moles) of sodium bicarbonate in 5000 grams of acetone. The addition was accomplished over a period of 3 hours and 25 minutes while the temperature of the slurry was maintained at 25° C.–29° C. The reaction mixture was then agitated for 45 minutes. The pH of a sample extracted from the clear acetone layer was 6. The insoluble salts were removed by filtration, the filter cake was washed with 1200 grams of acetone and the filtrates combined.

Five grams of gamma-aminopropyltriethoxysilane were added to the combined filtrates whereby the pH of the filtrate was brought to 7.8. The acetone was distilled off from the filtrates by gradually applying a vacuum of 29 inches of mercury thereto at a temperature of 115° C. The viscous residue was dissolved in 500 grams of toluene and the solution cooled to 70° C. Once the solution was cooled to 70° C., 100 grams of isopropanol were added whereby 1875 grams of an organopolysiloxane varnish were produced. The varnish had a solids content of about 68.4 percent by weight as determined by weighing the residue from a one gram sample after exposure to a temperature of 160° C. for 10 minutes.

*Example III*

Organopolysiloxane resin varnishes were prepared by the procedure described in Example I using aminoalkylsilicon catalysts which are noted in the table below. The hydrolyzable silane feed in each case was the same as in Example I. The procedure used to determine the time required for a sample of the varnish to become infusible is also described in Example I with the exception that only choline was used as the hardening catalyst.

| Catalyst | Amount of Varnish Produced, grams | Percent Solids in Varnish | Percent Choline Based on Solids Content | Gel Time, seconds |
| --- | --- | --- | --- | --- |
| 5 grams of delta-aminobutyldiethoxysilane | 1,830 | 68.1 | 0.140 | 20 |
| 8 grams of bis-(gamma-triethoxysilylpropyl)amine | 1,875 | 69.2 | 0.066 | 37.5 |
| 4.4 grams of gamma-aminopropylmethyldiethoxysilane | 1,859 | 67.5 | 0.066 | 23 |
| 8.4 grams of a copolymeric siloxane oil having a molecular weight of about 5,000, containing about 25 parts by wt. of gamma-aminopropylmethylsiloxy groups and about 75 parts by wt. dimethylsiloxy groups, per 100 parts by weight of the siloxane oil | 1,877 | 67.0 | 0.066 | 25 |
| 18.1 grams of a copolymeric siloxane oil having a molecular weight of about 1,000, containing about 13 parts by wt. delta-aminobutylmethylsiloxy groups and about 77 parts by wt. dimethylsiloxy groups, per 100 parts by weight of the siloxane oil | 1,836 | 68.7 | 0.066 | 26 |

*Example IV*

This example shows that laminates characterized by excellent color stability can be prepared using the organopolysiloxane resins of the present invention.

The varnish, whose method of preparation is described in Example I, was diluted to a solids content of about 60 percent by weight by the addition thereto of toluene. To a sample of the varnish there was added 0.03 percent by weight chloine and 0.5 percent by weight of a toluene solution containing 12 percent by weight of a paste made up of equal parts by weight of tricresyl phosphate and benzoyl peroxide. The percent by weight of the toluene solution and the choline were based on the weight of the solids content of the varnish. The varnish was charged into the pan of a laboratory treater. A roll of glass cloth (manufactured by Hess-Goldsmith Co., designated as H6–28 with a 112/pH 7 finish) was passed through the varnish into a 20 foot long drying oven at 130° C. at the rate of 5 feet per minute.

The treated cloth, containing 38 percent by weight organopolysiloxane resin and 0.5 percent volatiles was cut into 12-inch squares. Laminates having a thickness of ⅛ inch were made in the following manner: 21 squares were laid one on each other, placed in a laminating press and heated at 160° C. for one hour while under 1000 p.s.i. pressure. The press was cooled to a temperature of about 25° C., the laminate removed and post-cured according to the following schedule: 16 hours at 80° C., one hour at 100° C., one hour at 150° C., 2 hours at 200° C., and finally for four hours at 250° C.

The laminate was of an excellent light color.

To further indicate the excellent color stability of the organopolysiloxane resins of the present invention, a varnish previously identified as Control A was used to prepare laminates by the method described above. The laminates produced had an undesirable and unsightly dark brown color, delaminated readily and were generally of poor quality.

The organopolysiloxane resins of the present invention can be used in a variety of applications. For example, the organopolysiloxane resins, in addition to being used as laminating varnishes, have found wide use in molding applications. These organopolysiloxane resins can be blended with conventional fillers such as siliceous fillers, lubricants, and accelerators, and molded into desired products. The organopolysiloxane resins are also useful as "finishing" or "sizing" agents for mineral cloth and mineral fibers such as glass cloth, glass fibers, and the like. Mineral fibers treated with the organopolysiloxane resins of the present invention possess excellent lubricity and can be processed into cloth material more readily as the treated fibers are less prone to scratching and other mechanical damage during wearing, twisting, and other fabricating operation. The attribute of reduced incidence of scratching results in improved strength properties of the cloth material as reflected for example by higher fiber knot tensile strength.

What is claimed is:

1. Method of producing a hardenable organopolysiloxane resin which comprises condensing a silanol produced by the water hydrolysis of silanes having the formula $$R'_nSiX_{4-n}$$

wherein R' is a member of the class consisting of monovalent hydrocarbon groups and chloro- and cyano-substituted monovalent hydrocarbon groups, X is a hydrolyzable group and n has a value of from 0 to 3, in the presence of a catalytic amount of an aminoalkylsilicon compound of the formula:

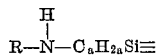

wherein R is a member selected from the group consisting of hydrogen, hydrocarbon, and $-C_aH_{2a}Si\equiv$; all silicon atoms of the said aminoalkylsilicon compound being connected to 0 to 3 oxygen atoms which in turn are connected to no other elements than the carbon of a hydrocarbon group, hydrogen and silicon, the remaining unfilled valences of the said silicon atoms being satisfied by hydrocarbon groups and wherein (a) is an integer from 1 to 15.

2. Method as defined in claim 1 wherein the aminoalkylsilicon compound is gamma-aminopropyltriethoxysilane.

3. Method as defined in claim 1 wherein the aminoalkylsilicon compound is delta-aminobutylmethyldiethoxysilane.

4. Method as defined in claim 1 wherein the aminoalkylsilicon compound is bis-(gamma-triethoxysilyl-propyl)amine.

5. Method as defined in claim 1 wherein the aminoalkylsilicon compound is a polymeric siloxane oil having a molecular weight of about 5000 and containing about 25 parts by weight of gamma-aminopropylmethylsiloxy groups and about 75 parts by weight of dimethylsiloxy groups per 100 parts by weight of the said siloxane oil.

6. Method as defined in claim 1 wherein the aminoalkylsilicon compound is a polymeric siloxane oil having a molecular weight of about 1000 and containing about 13 parts by weight of delta-aminobutylmethylsiloxy groups and about 77 parts by weight of dimethylsiloxy groups per 100 parts by weight of the said siloxane oil.

7. Method as defined in claim 1 wherein $n$ has a value of from about 0.95 to about 1.6.

8. Method as defined in claim 1 wherein the silane is a mixture of dimethyldichlorosilane, diphenyl-dichlorosilane, methyltrichlorosilane, and phenyltrichlorosilane.

9. A method as defined in claim 1 wherein the aminoalkylsilicon compound is present in an amount sufficient to maintain the pH between 7.5 and 8.5.

10. Method as defined in claim 1 wherein ($a$) is an integer from 3 to 15.

11. Method of producing a hardenable organopolysiloxane resin which comprises condensing a silanol produced by the water hydrolysis of silanes having the formula:

$$R'_nSiX_{4-n}$$

wherein R' is a monovalent hydrocarbon group, X is a hydrolyzable group selected from the class consisting of halogen groups and alkoxy groups and $n$ has a value of from 0 to 3, in the presence of a catalytic amount of an aminoalkylalkoxysilane of the formula:

$$H_2N-C_aH_{2a}Si\equiv$$

wherein all silicon atoms of said aminoalkylalkoxysilane being connected to 1 to 3 oxygen atoms which in turn are connected to no other elements than the carbon of a hydrocarbon group, the remaining unfilled valences of said silicon atoms being satisfied by hydrocarbon groups and wherein ($a$) is an integer from 3 to 15.

12. Method as defined in claim 11 wherein $n$ has a value of from about 0.95 to about 1.6.

13. Method of producing a hardenable organopolysiloxane resin which comprises condensing a silanol produced by the water hydrolysis of silanes having the formula:

$$R'_nSiX_{4-n}$$

wherein R' is a monovalent hydrocarbon group, X is a hydrolyzable group selected from the class consisting of halogen groups and alkoxy groups and $n$ has a value of from 0 to 3, in the presence of a catalytic amount of an aminoalkylsiloxane of the formula:

$$H_2N-C_aH_{2a}Si\equiv$$

wherein all silicon atoms of said aminoalkylsiloxane being connected to 1 to 3 oxygen atoms which in turn are connected to no other elements than silicon, the remaining unfilled valences of said silicon atoms of said aminoalkylsiloxane being satisfied by hydrocarbon groups and wherein ($a$) is an integer from 3 to 15.

14. Method as defined in claim 13 wherein $n$ has a value of from about 0.95 to about 1.6.

References Cited in the file of this patent

UNITED STATES PATENTS

| | | |
|---|---|---|
| 2,456,783 | Hyde | Dec. 21, 1948 |
| 2,557,803 | Sommers | June 19, 1951 |
| 2,881,184 | Pike | Apr. 7, 1959 |
| 2,907,782 | Pike | Oct. 6, 1959 |
| 2,921,950 | Jex et al. | Jan. 19, 1960 |
| 2,942,019 | Pike et al. | June 21, 1960 |
| 2,947,771 | Bailey | Aug. 2, 1960 |

UNITED STATES PATENT OFFICE
CERTIFICATE OF CORRECTION

Patent No. 3,068,199                        December 11, 1962

Ralph F. Sellers

It is hereby certified that error appears in the above numbered patent requiring correction and that the said Letters Patent should read as corrected below.

Column 1, line 54, for "post-care" read -- post-cure --; column 4, lines 67 and 68, for "disphenyldichlorosilane" read -- diphenyldichlorosilane --; column 5, in the table, first column, line 1 thereof, for "delta-aminobutyl-" read -- delta-aminobutylmethyl- --.

Signed and sealed this 10th day of September 1963.

(SEAL)
Attest:

ERNEST W. SWIDER                              DAVID L. LADD
Attesting Officer                                Commissioner of Patents